United States Patent
Chalopin et al.

(10) Patent No.: US 7,325,088 B2
(45) Date of Patent: Jan. 29, 2008

(54) MANAGEMENT OF INDEXED REGISTERS IN A SYSTEM ON A CHIP

(75) Inventors: Hervé Chalopin, Aubagne (FR); Laurent Tabaries, Aubagne (FR)

(73) Assignee: STMicroelectronics S.A., Montrouge (FR)

(*) Notice: Subject to any disclaimer, the term of this patent is extended or adjusted under 35 U.S.C. 154(b) by 337 days.

(21) Appl. No.: 11/120,171

(22) Filed: May 2, 2005

(65) Prior Publication Data

US 2005/0256993 A1    Nov. 17, 2005

(30) Foreign Application Priority Data

May 3, 2004    (FR) .................................. 04 04702

(51) Int. Cl.
*G06F 12/00*    (2006.01)
(52) U.S. Cl. .................... 711/100; 711/200; 711/147; 711/150; 711/151; 711/152; 711/154
(58) Field of Classification Search ............... 711/100, 711/200, 147, 150, 151, 152, 154
See application file for complete search history.

(56) References Cited

U.S. PATENT DOCUMENTS 5,832,533 A    11/1998    Agarwal et al. ............... 711/2
6,188,411 B1 *    2/2001    Lai ............................ 345/559

* cited by examiner

*Primary Examiner*—Kimberly McLean-Mayo
(74) *Attorney, Agent, or Firm*—Lisa K. Jorgenson; Robert Iannucci; Seed IP Law Group PLLC

(57) ABSTRACT

An electronic system comprises a control unit for ordering the storage of an index value for indexed registers, in an additional index register linked to a defined initiator module, in response to a request to write the index value in an index register linked to the indexed registers, initiated by the initiator module. In response to any request to access an indexed register initiated by a defined initiator module, the control unit copies the index value from the additional index register linked to this initiator module to the index register linked to this indexed register, prior to execution of the access request. This enables management of access to indexed registers associated with an arbitration mechanism provided for managing conflicting access requests initiated by different functional modules in a system on a chip.

28 Claims, 4 Drawing Sheets

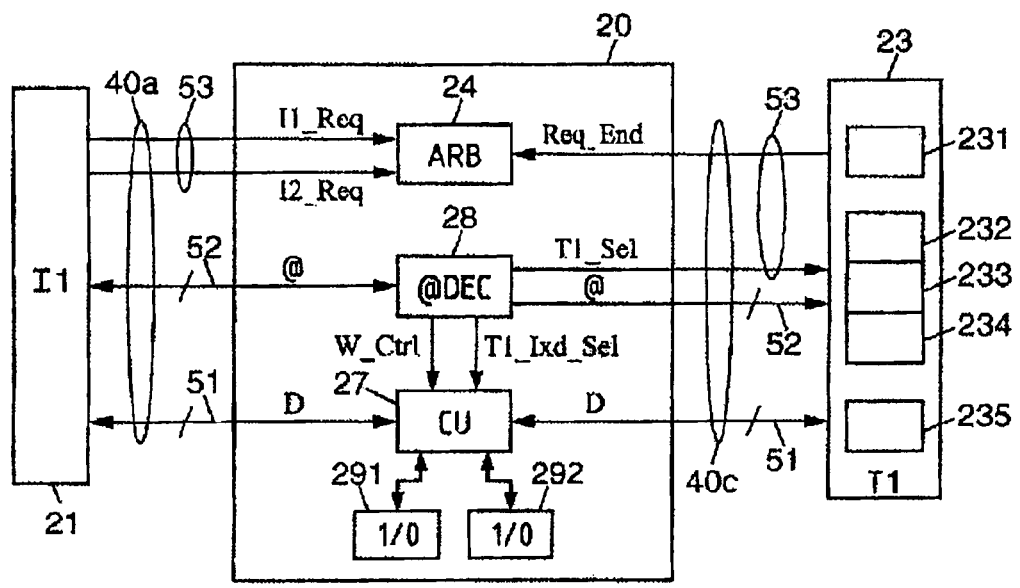
FIG. 3
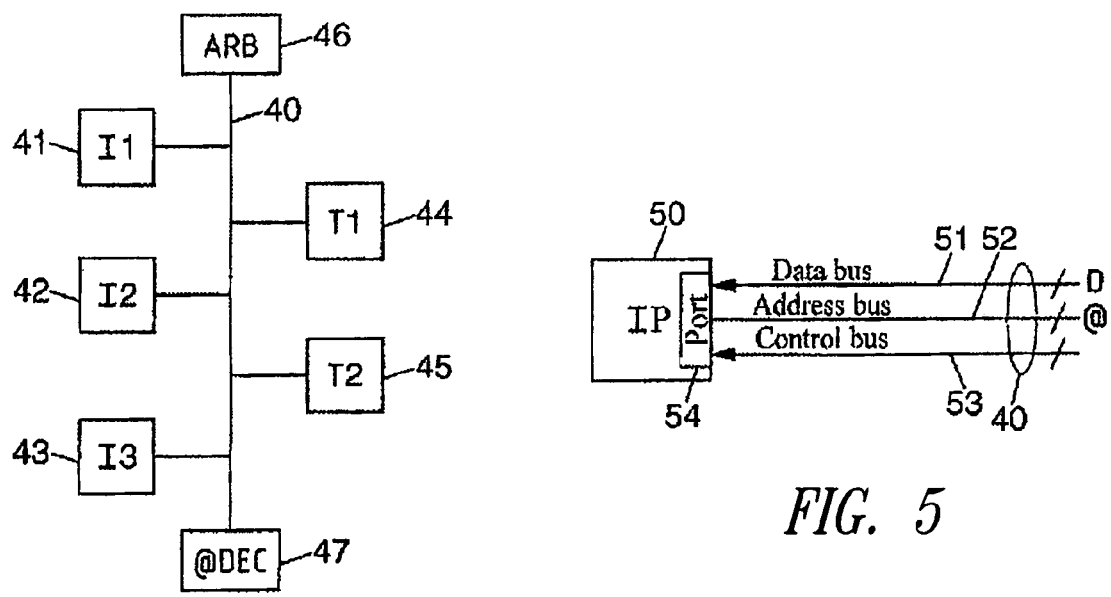
FIG. 4
FIG. 5

| @ ? | T1_Sel | T2_Sel |
|---|---|---|
| @REG_T1 | 1 | 0 |
| @REG_idx0_T1 | 1 | 0 |
| @REG_idx1_T1 | 1 | 0 |
| @REG_idx2_T1 | 1 | 0 |
| @REG_0_T2 | 0 | 1 |
| @REG_1_T2 | 0 | 1 |
| @REG_2_T2 | 0 | 1 |

*FIG. 7*
*(Prior Art)*

| @ ? | T1_Sel | T1_Idx_Sel | T2_Sel |
|---|---|---|---|
| @REG_T1 | 1 | 0 | 0 |
| @REG_idx0_T1 | 0 | 1 | 0 |
| @REG_idx1_T1 | 0 | 1 | 0 |
| @REG_idx2_T1 | 0 | 1 | 0 |
| @REG_0_T2 | 0 | 0 | 1 |
| @REG_1_T2 | 0 | 0 | 1 |
| @REG_2_T2 | 0 | 0 | 1 |

*FIG. 8*

MANAGEMENT OF INDEXED REGISTERS IN A SYSTEM ON A CHIP

BACKGROUND OF THE INVENTION

1. Field of the Invention

The present invention relates generally to the field of digital electronic systems in integrated circuit form, called "systems on a chip" or SoC.

2. Description of the Related Art

More specifically, the invention relates to the management of access to indexed registers associated with arbitration mechanisms provided for managing conflicting access requests initiated by different functional modules in such a system.

In a system on a chip, resources are conventionally shared between the functional modules that have access to them. Such a functional module is sometimes called a virtual component or an "intellectual property" block, or even IP block in professional jargon. It is designed to handle a defined function, or is for general-purpose use (it may be a microprocessor or a microcontroller). It can be implemented in the form of hardware and/or software elements.

A distinction is drawn between master type modules (hereinafter called initiator modules), which take the initiative to exchange data with one or more other modules, and slave type modules (hereinafter called target modules), the role of which is to respond to the requests received from the initiator module which has control. If there is a plurality of initiator modules, an arbitration unit (or arbiter) is required to arbitrate between conflicting requests to access a common resource originating from different initiator modules, to grant an exclusive right of access to the resource to a specific one of said initiator modules.

Conventionally, at least one target module includes data registers, which can be accessed by initiator modules via a defined address, and of which at least some are indexed registers. The set of registers addressable in this way forms the system's memory plane. An indexed register is a multiple data storage space, but addressable by a unique address, combined with an indexing mechanism using a linked index register. Note that the index register is normally common to all the indexed registers of a particular functional module. A register indexing mechanism is comparable to a memory paging mechanism.

To allow the indexed registers to be used by the initiator modules, the associated index register is accessible in write mode via an ad hoc write request. This write request is used to store in the index register an index value for the indexed registers. It can originate from the initiator module which needs to access one of the indexed registers, and then precedes a request or a series of requests to access this indexed register produced by that initiator module.

Currently, for any type of data register (i.e., conventional register or indexed register), access requests are undifferentiated, inasmuch as there is nothing to distinguish a request relating to a conventional register from a request relating to an indexed register.

In certain applications, this can lead to a software overload in the code of the application to be executed, and therefore to performance losses at system level.

In addition, if an initiator module sends a series of successive access requests for a particular indexed register, and if the target module at the same time is the object of a conflicting access request originating from another initiator module, there is then a major risk that the arbitration unit will order a change of priority in favor of said other initiator module. Such is particularly the case if the arbitration unit implements an arbitration mechanism with a round-robin algorithm, which assigns the right of access sequentially to the requesting initiator modules (i.e., each in turn), or a seniority-based, "least recently used" (LRU) algorithm, which grants the right of access to the initiator module that requests it and which had access least recently. Said other initiator module can then write to the index register another index value to access another indexed register. When the arbitration unit returns control to the initial initiator module, this module believes that it will continue to access the initial indexed register, although it will in reality finish executing its series of requests by accessing said other indexed register, in other words, the indexed register which the other initiator module has just accessed.

The code of the application will not therefore be executed correctly. The result is that the application will be corrupted.

BRIEF SUMMARY OF THE INVENTION

To overcome these drawbacks, a first embodiment of the invention proposes an electronic system comprising:

at least a first and a second initiator module;

at least a target module having data registers accessible by said initiator modules and of which at least some are indexed registers, and an index register linked to the indexed registers and accessible in write mode via a corresponding write request, to store an index value for said indexed registers; and, an arbitration unit for arbitrating between conflicting requests to access the data registers, initiated by different initiator modules;

a first and a second additional index register, linked respectively to the first and second initiator modules;

an address decoding unit, constructed to set an indexed register select signal, in response to any request to access an indexed register; and, a control unit for:

ordering the storage of an index value for the indexed registers, in the additional index register linked to a defined initiator module, in response to a request to write said index value in the index register linked to said indexed registers, initiated by said initiator module; and for in response to any request to access an indexed register initiated by a defined initiator module which results in the indexed register select signal being set, copying the index value from the index register linked to said initiator module to the index register linked to said indexed register, prior to execution of said access request.

This double address decoding and index register management mechanism eliminates any risk of register address manipulation errors and also provides performance improvements. Advantageously, the indexed register select mechanism is implemented at hardware level, which optimizes access to both types of register (conventional registers and indexed registers) and secures simultaneous requests to access the indexed registers from different initiator modules.

A second embodiment of the invention relates to an address decoder intended to be used in a system according to the first embodiment, the address decoder including an address decoding unit according to the first embodiment.

A third embodiment of the invention proposes a storage key comprising at least a non-volatile memory and a control circuit, wherein the control circuit is a circuit on a chip (SoC) forming a system according to the first embodiment.

BRIEF DESCRIPTION OF THE SEVERAL VIEWS OF THE DRAWING(S)

Other characteristics and advantages of the invention will emerge on reading the description that follows. This is purely illustrative and should be read alongside the appended drawings, in which:

FIG. 3 is a block diagram of a typical control module which can be used in a system according to FIG. 2;

FIG. 4 is a block diagram of another typical electronic system according to the first embodiment of the invention;

FIG. 5 is a diagram illustrating the coupling of a functional module to a communication bus;

FIG. 7 is a table illustrating address decoding according to the prior art; and

FIG. 8 is a table illustrating address decoding according to the second embodiment of the present invention.

DETAILED DESCRIPTION OF THE INVENTION

The invention is described below in an example of application to a control circuit intended to manage a storage key or memory key.

A memory key forms a mass storage medium of small size, mounted in a removable support taking the form of a key or key holder. This medium is used to store and transport easily a certain quantity of data, in order, for example, to transfer it from one computer to another. Such a memory key is in principle inserted into the USB (Universal Serial Bus) ports of the computers. This is why it is also referred to as USB storage key, USB memory key or quite simply USB key.

Figure 1:
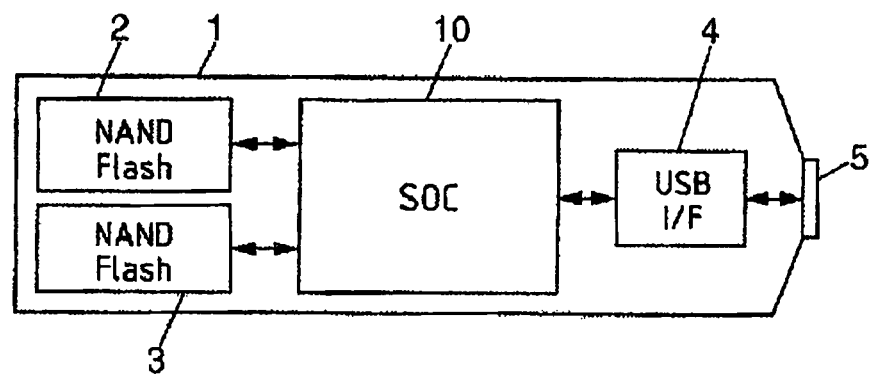
FIG. 1 is a block diagram of a typical memory key according to the third embodiment of the invention.

In FIG. 1, such a memory key 1 comprises a control circuit 10, coupled to a USB type connector 5, via a USB interface circuit 4. Moreover, circuit 10 is coupled to one or more non-volatile, large capacity memories 2, 3, which are typically NAND-Flash or similar type memories. The circuit 10 is remotely powered when the memory key 1 is connected via connector 5 to a computer (not shown) or similar. The interface circuit 4 can, for example, provide compatibility with the USB 2.0 standard (standard for data interchange between general purpose computers and their peripheral devices).

The control circuit can advantageously be a system on a chip (SoC) to provide a high degree of integration that allows the miniaturization desired for this kind of electronic product.

Figure 2:
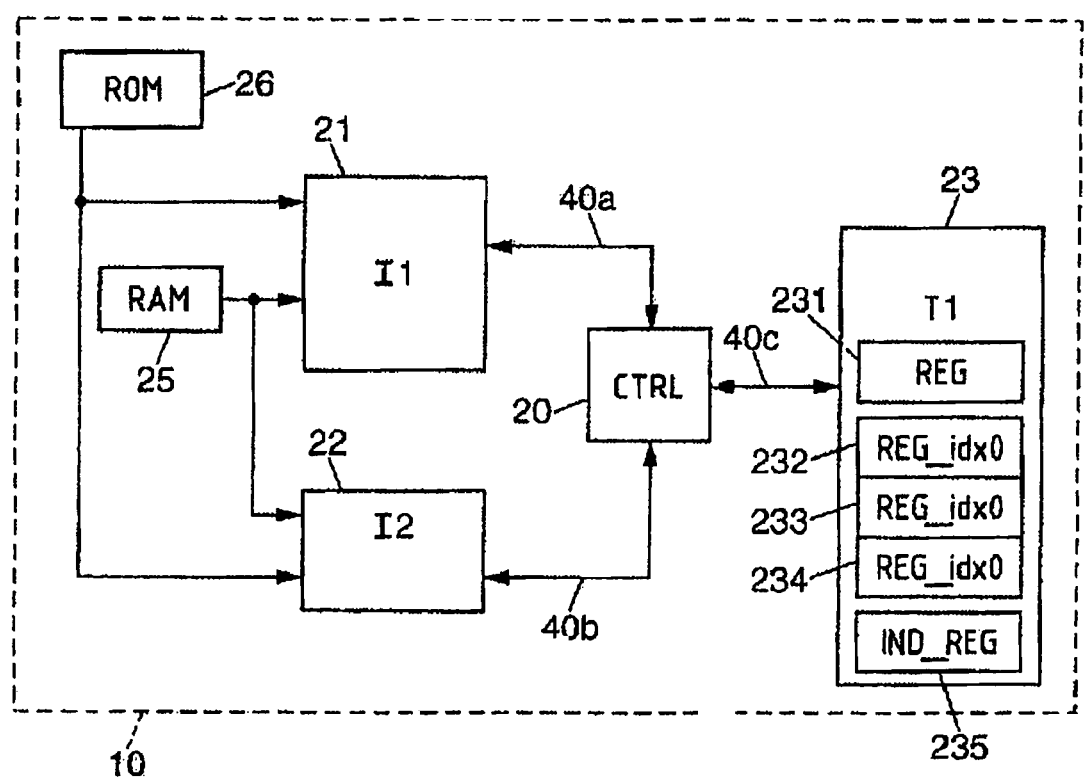
FIG. 2 is a block diagram of a typical electronic system according to the first embodiment of the invention, which can be included in the memory key in FIG. 1.

FIG. 2 illustrates a typical architecture of such a system.

In this example, the system 10 comprises two cores 21 and 22, which are, for example, respectively a microcontroller such as the ST7 from STMicroelectronics, and a coprocessor dedicated to control operations for the mass storage means formed by the internal memories 2 and 3.

These cores 21 and 22 are designed as initiating type functional modules (respectively 11 and 12). For communication between themselves and with other functional modules, they comply, for example, with the specifications of the VCI (Virtual Component Interface) standard of the VSIA ("Virtual Socket Interface Alliance"), Wakefield, Mass., United States. To that end, certain modules may need a VCI interface, as is the case with the ST7 microcontroller, although this interface is not shown in the figure, because, as such, they do not support this standard.

A volatile memory (random access memory RAM) 25 is used by the modules 21 and 22 to store temporary information, linked to the application concerned. In addition, a non-volatile memory (read only memory ROM) 26 stores permanent data, in particular the code of the application which is loaded into the modules 21 and/or 22 on power up.

The system 10 also comprises a peripheral controller 23, in particular a USB 2.0 function controller, such as the MUSBHSFC Inventra™ virtual component from Mentor Graphics, as a target type functional module (T1). This virtual component is compatible with the aforementioned VCI standard.

In one example, the module 23 comprises four data registers, including a conventional register 231 (REG), and three indexed registers 232 (REG_Idx0), 233 (REG_Idx1) and 234 (REG_Idx2). The conventional register 231 can be addressed by the initiator modules 21 and 22 via an address value @Reg_T1. The indexed registers 232-234 can be addressed by the initiator modules 21 and 22 via a common address value @Reg_Idx_T1, different from the address @Reg_T1, combined with an index value of Idx0, Idx1 and Idx2 respectively. To access one of the indexed registers 232 to 234 via an access request including the address @Reg_Idx_T1 as a parameter, in accordance with an indexing mechanism that is known per se, the corresponding index value Idx0, Idx1 or Idx2 is first written into an index register 235 (IDX$_{13}$ REG) of the target module 23.

Both the microcontroller 21 and the coprocessor 22 can have access, on request, to the data registers of the peripheral controller 23. Data can be interchanged between the initiator modules 21 and 22 on the one hand, and the target module 23 on the other, via a control module 20 which is linked to them on an ad hoc basis, typically via communication buses like the VCI OCB (VCI On Chip Bus). In other words, the controller 23 is a resource common to both cores 21 and 22. In the example shown, the control module 20 is linked to the modules 21, 22 and 23 by communication buses 40a, 40b and 40c respectively.

The diagram in FIG. 5 illustrates the connection of a functional module 50 to a communication bus 40 which comprises channels for data communication between this module and another functional module.

The communication bus 40 can thus comprise, in an example, a data bus 51, an address bus 52 and a control bus 53. In some cases, the data bus 51 comprises a sub-data bus for reading data, and a sub-data bus for writing data. The functional module 50 comprises a communication port 54 which can be a master or slave type port depending on whether the module 50 is an initiator module or a target module, respectively. The port 54 provides the link from the module 50 to the communication bus 40.

The data bus 51 is used to transmit data signals (D), which contain the information interchanged between the modules of the system.

The address bus 52 is used to transmit the address values (@), which indicate the module in which the data transmitted over the data bus must be read or written, and, where appropriate, the location of the data within the module concerned.

Finally, the control bus 53 is used to transmit the control signals. Such signals are used in particular by the initiator modules to send requests to access registers in the target modules. They are also used by the target modules to indicate the end of a transaction, and, where appropriate, the success or failure of the transaction. Other control signals are also used to define the direction of the transaction (read or write), synchronize interchanges, etc.

There now follows a description of an embodiment of the control module 20, with reference to the diagram in FIG. 3 (in the interests of simplicity, only the connections from the control module 20 to the target module 23 and the initiator module 21 are shown in this figure).

Since the controller 23 is a resource common to both cores 21 and 22, the control module 20 includes an arbitration unit 24 (ARB). The designation I1_Req is given to an access request signal delivered to the arbitration unit 24 by the initiator module 21 via the control bus 53 of bus 40a. This signal is activated (that is, set to its active state, for example the logic 1 state), when the initiator module 21 needs to access the target module 23. There is conflict when signals of this type received from more than one initiator module are active simultaneously. The arbitration unit 24 must arbitrate on this conflict, to grant an exclusive right of access to the resource to just one of the initiator modules concerned.

To this end, the arbitration unit 24 implements an arbitration mechanism which can be of any known type, for example a round robin, least recently used or fixed priority algorithm.

Also, the arbitration unit 24 receives a control signal Req_End from the target module 23, via the control bus 53 of bus 40a. This signal is active (for example, in the logic 1 state) to indicate that processing by the target module of the current request is complete. In practice, the arbitration unit 24 must not allow access to the target module by another initiator module before processing of the current request is finished. In other words, the exclusive right of access granted to an initiator module must be maintained until processing of the request for which it was granted is finished.

The control module 20 also includes an address decoding unit 28 (@DEC). This receives an address @ via the address bus 52 of bus 40a, which address is placed on this bus on an access request initiated by the initiator module. This address identifies the data register affected by the access request. In a manner that is known per se, unit 28 generates a component select signal T1_Sel, which is a control signal indicating to the target module 23 that the access request concerns one of its registers. The T1_Sel signal is transmitted to the module 23 via the control bus 53 of bus 40c. In addition, the address @ is transmitted to the module 23 via the address bus 52 of bus 40c.

Furthermore, the unit 28 generates an indexed register select signal T1_Idx_Sel that is set to the active state (for example, to the logic 1 state) when the address @ is that of an indexed register, in other words, in the case of a request to access an indexed register. Similarly, the unit 28 generates a storage control signal W_Ctrl (see below) which is set when the address @ placed on the address bus 52 of bus 40a by the initiator module 21 corresponds to that of the index register 235 of the target module 23 (or one of the target modules if there is a plurality of target modules), in other words, in case of a request to write into said index register.

The control module 20 finally comprises a control unit 27 (CU) and two additional index registers 291 and 292, linked respectively to the initiator modules 21 and 22.

The function of the unit 27 is to control the storage of an index value for the indexed registers 232 to 234, in the additional index register 291 or 292 linked to one of the initiator modules, 21 or 22 respectively, in response to a request to write this index value into the index register 235 linked to said indexed registers, initiated by said initiator module, 21 or 22 respectively. To fulfil this function, the control unit 27 is coupled to the initiator module 21 via the data bus 51 of bus 40a, to receive the index value placed on this bus by the initiator module 21 on a request to write into the index register 235. It also receives from the address decoding unit 28, the aforementioned storage control signal W_Ctrl. In response to this signal W_Ctrl in the active state, it stores the index value concerned in the register 291 or in the register 292, according to the case.

Another function of the unit 27, in response to any request to access one of the indexed registers 232-234 initiated by one of the initiator modules 21, 22, which causes the indexed register select signal T1_Idx_Sel to be set (i.e., set to the logic 1 state), is to copy the index value from the additional index register 291 or 292 linked to said initiator module to the index register 235 linked to said indexed register, prior to execution of said access request. To fulfil this function, the unit 27 receives the control signal T1_Idx_Sel from the address decoding unit 28. In addition, it is coupled to the target module 23 via the data bus 51 of bus 40c.

Figure 6:
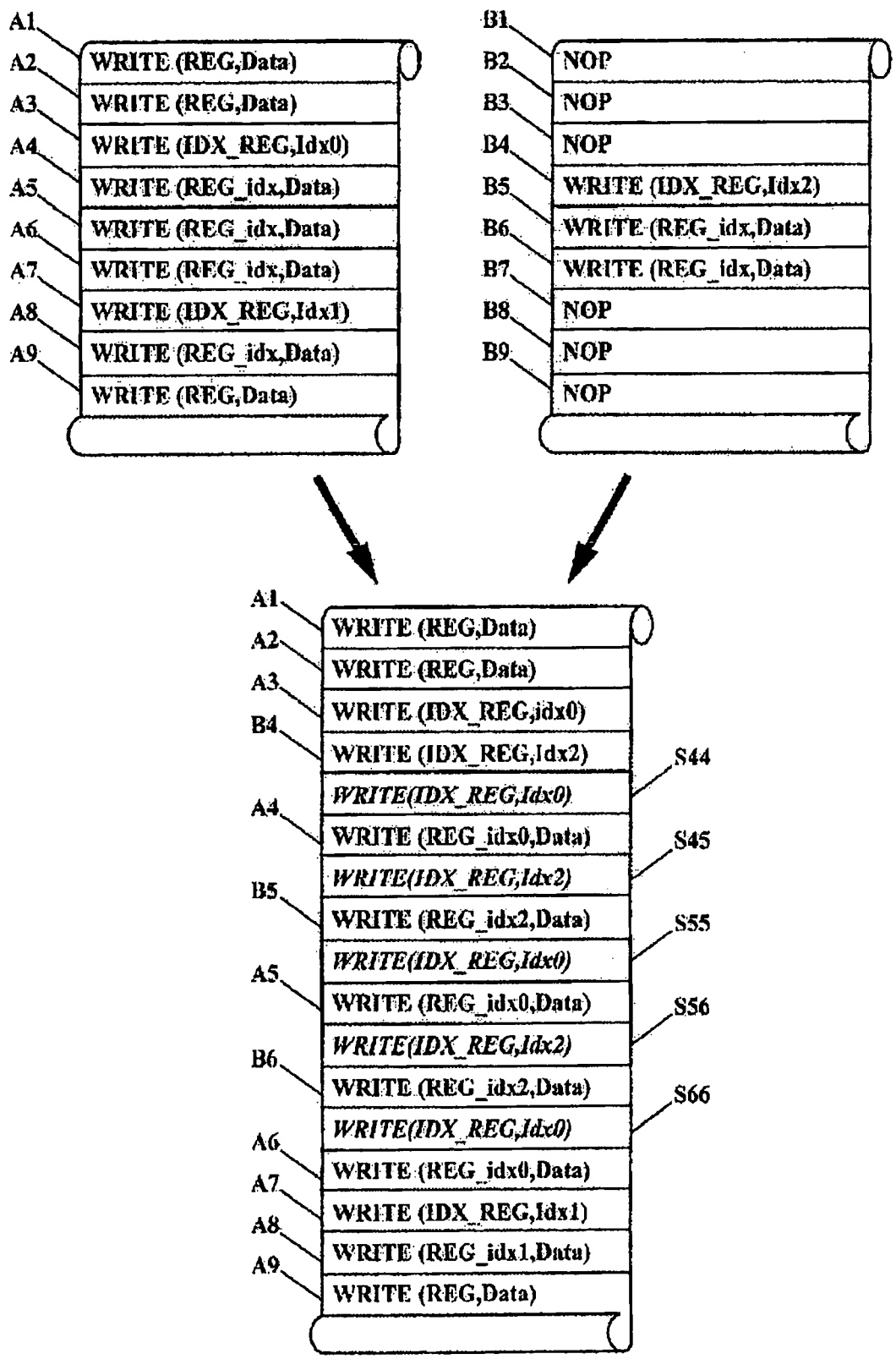
FIG. 6 is a diagram illustrating typical operation of the control module in a system according to FIG. 2.

FIG. 6 illustrates an example of operation of the control unit 27 according to the present invention.

Top left, FIG. 6 shows a sequence of instructions A1-A9 to be executed by initiator module 21. Top right, FIG. 6 shows a sequence of instructions B1-B9 to be executed in parallel by the initiator module 22.

Instructions A1, A2 and A9 are write instructions (WRITE), to write any data (DATA) into conventional register 231 of the module 23, the address of which is, for example, @REG. Instructions A4-A6 form a sequence of successive instructions to write any data into the indexed register 232 of the target module 23, the address of which is, for example, @REG_idx and the index value of which is, for example, Idx0. Consequently, these instructions A4-A6 are, conventionally, preceded by an instruction A3 to write the value Idx0 into the index register 235 of the module 23, the address of which is, for example, @IDX_REG. Finally, instruction A8 is an instruction to write any data into the indexed register 233 of the target module 23, the address of which is also @REG_idx (as for register 232), but the index value of which is, for example, Idx1. Consequently, this instruction A8 is, conventionally, preceded by an instruction A7 to write the value Idx1 into the index register 235 of the module 23, at the address @IDX_REG.

Instructions B1-B3 and B7-B9 are wait instructions (NOP, short for "No OPeration"), in other words, they do not correspond to any effective operation. Instructions B5 and B6 form a sequence of successive instructions to write any data into the indexed register 234 of the target module 23, the address of which is also @REG_idx, but the index value of which is, for example, Idx2. Consequently, these instructions B5 and B6 are, conventionally, preceded by an instruction B4 to write the value Idx2 into the index register 235 of the module 23, at the address @IDX_REG.

Note that, in response to instructions A3, A7 and B4 to write into the index register 235 an index value, Idx0, Idx1 and Idx2 respectively, the control module writes said index value into the additional register 291 (for instructions A3 and A7) or into the additional register 292 (for instruction B4).

The bottom and middle of FIG. 6 show an example of a sequence of instructions controlled in practice by the control module 20, taking into account the arbitration needed between conflicting (that is, simultaneous) requests (instructions) from the initiator modules 21 and 22 and also applying the rules for managing the index register of the target module 23 as defined above.

To begin, the arbitration unit 24 of the control module 20 grants access to target module 23 in favor of the initiator module 21, to execute instructions A1-A3. In practice, there is no conflict with the initiator module 22, given that this does not produce any simultaneous request to access the registers of the target module 23.

Then, the arbitration unit 24 of the control module 20 arbitrates between the conflict between instructions A4 and B4, A5 and B5 and A6 and B6. Assuming that it implements a round robin or least recently used algorithm-based arbitration mechanism, it grants the right of access to the target module 23, alternately to the initiator module 22 and the initiator module 21, to execute instructions B4, A4, B5, A5, B6 and A6, in that order.

In addition, before each of instructions A4, A5 and A6, the control unit 27 of the control module 20 generates an additional write instruction, S44, S55 and S66 respectively, to copy the index value stored in the additional register 291, in other words, the Idx0 value in the example, into the index register 235 of the target module 23.

Similarly, before each of instructions B5 and B6, the control unit 27 of the control module 20 generates an additional write instruction, S45 and S56 respectively, to copy the index value stored in the additional register 292, in other words, the Idx2 value in the example, into the index register 235 of the target module 23.

Finally, after executing instruction A6, the arbitration unit 24 of the control module 20 hands control to the initiator module 21 to execute instructions A7-A9, given that there is no more conflict with instructions initiated by the module 22.

The invention was described above in a preferred but non-limiting example of application.

For example, one embodiment has been described in which the control module 20 incorporates the arbitration unit, the address decoding unit and/or the control unit. As a variant, the arbitration unit can be independent, being coupled to a communication bus linking the functional modules of the system. Similarly, the decoding unit can be included in an address decoder that can be used in a system according to the present invention.

In addition, the embodiment described above provides for the additional index register 291 linked to the initiator module 21 and the additional index register 292 linked to the initiator module 22 to be included in the control module. This is not mandatory. The control module 20 could include only one or none of the additional index registers 291, 292. In other embodiments, the additional index register 291 linked to the initiator module 21 is included in said initiator module, and/or the additional index register 292 linked to the initiator module 22 is included in said second initiator module.

Also, in the above example, the number N of functional modules in the system is equal to 3, the number P of initiator modules is equal to 2 and the number Q of target modules is equal to one. However, it is understood that the invention can be applied equally to more complex system architectures, provided that $2 \leq P \leq N$ and $1 \leq Q \leq N$. Note in addition that certain functional modules may be both initiating and target modules.

As an illustration, the diagram in FIG. 4 shows the architecture of a system with a communication bus 40. Initiator modules 41, 42 and 43, and target modules 44 and 45 are linked to bus 40. Each of the above modules is linked to the bus 40 via a master or slave type communication port depending on whether the module concerned is an initiating or target type module, respectively. It should be remembered that certain modules can be both initiating and target type modules. In this case, they are linked to the bus 40 via respective ad hoc communication ports.

The system also comprises an address decoder 47 which is linked to the bus 40, and an arbitration unit 46, or arbiter, which is also linked to the bus 40 to handle the selection of that one of the initiator modules 41, 42 or 43 which has control of the bus 40 at a defined instant.

The arbitration unit 46 can correspond to the arbitration unit 24 in FIG. 3.

The address decoder 47 can contain the address decoding unit 28 in FIG. 3. Note that this decoding unit outputs an indexed register select control signal (like signal T1_Idx_Sel) for each target module, or, more usually, for each group of indexed registers that are linked to one and the same defined index register (bearing in mind that, usually, all the indexed registers of a particular component are linked to one and only one index register). Similarly, it outputs as many component select signals (such as signal T1_Sel in FIG. 3) as there are target modules.

Finally, the control unit 27 in FIG. 3 can be included in the arbitration unit 46.

Each of components 41-47 above is linked to the bus 40 which is, for example, a VCI OCB, in the manner described above with reference to the diagram in FIG. 5.

Examples of address decoding executed by a decoding unit according to the prior art and according to an embodiment of the present invention are described by the tables in FIGS. 7 and 8 respectively.

It is assumed that the target module 44 (T1) has a conventional register addressable via the address value @REG_T1, and three indexed registers addressable via the address values @REG_Idx0_T1, @REG_Idx1_T1 and @REG_Idx2_T1 respectively. In addition, it is assumed that the target module 45 (T2) has three conventional registers addressable via the address values @REG0_T2, @REG1_T2 and @REG2_T2 respectively.

The table in FIG. 7 gives the logic 1 or 0 state of the signals T1_Sel and T2_Sel, according to a conventional address decoding. The circuit select signal T1_Sel is set (i.e., set to the logic 1 state) when the address @ received at the input is equal to @REG_T1, @REG_Idx0_T1, @REG_Idx1_T1 or @REG_Idx2_T1, that is, when any one of the registers (conventional or indexed) of the module 44 is targeted. It is at the logic 0 state otherwise. Similarly, the circuit select signal T2_Sel is set (i.e., set to the logic 1 state) when the address @ received at the input is equal to @REG0_T2, @REG1_T2 or @REG2_T2, that is, when any one of the registers (conventional or indexed) of the module 45 is targeted. It is at the logic 0 state otherwise.

However, in addition to this conventional decoding, it is possible to differentiate requests to access component T2, by determining each time whether the address @ received at the input is that of one of its indexed registers. A register select signal T1_Idx_Sel is then created, in addition to the circuit select signal T1_Sel, which specifies to the target module 23 whether it is a conventional or indexed register that is targeted.

The table in FIG. 8 therefore gives the logic 1 or 0 state of indexed register select signal T1_Idx_Sel, in addition to signals T1_Sel and T2_Sel. It can be seen that signal T1_Idx_Sel is set (i.e., set to the logic 1 state) when the address @ received at the input is equal to @REG_Idx0_T1, @REG_Idx1_T1 or @REG_Idx2_T1, that is, when one of the indexed registers of module 44 is targeted.

In the embodiment represented, the signal T1_Sel is set only when the address @ is equal to @REG_T1, that is, when the conventional register 231 is targeted, and is in the logic 0 state otherwise. As a variant, it can be set when any one of the registers (conventional or indexed) of target module 23 is targeted, and can be at the logic 0 state otherwise, as shown in FIG. 7.

The hardware mechanism proposed by the invention offers a real optimization regarding the amount of application code to be written.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An electronic system comprising:
    first and second initiator modules;
    a target module having data registers accessible by said initiator modules and including a plurality of indexed registers, and an index register linked to the indexed registers and accessible in write mode via a corresponding write request, to store an index value for said indexed registers; and,
    an arbitration unit for arbitrating between conflicting requests to access the data registers, initiated by the initiator modules;
    first and second additional index registers, respectively linked to the first and second initiator modules;
    an address decoding unit constructed to set an indexed register select signal, in response to any request to access one of the indexed registers; and
    a control unit structured to, in response to a request from a requesting one of the initiator modules to write an index value in the index register linked to said indexed registers, order the storage of the index value in the additional index register linked to the requesting initiator module; and structured to, in response to any request to access one of the indexed registers, initiated by the requesting initiator module, which results in the indexed register select signal being set, copy the index value from the additional index register linked to said requesting initiator module to the index register linked to said indexed registers, prior to execution of said access request.

2. A system according to claim 1, further comprising a control module incorporating the arbitration unit, the address decoding unit and/or the control unit.

3. A system according to claim 2, wherein the first additional index register and/or the second additional index register are included in the control module.

4. A system according to claim 1, wherein the first additional index register linked is included in said first initiator module, and/or the second additional index register is included in said second initiator module.

5. A storage key, comprising:
    a non-volatile memory; and
    a circuit on a chip control circuit that includes:
    first and second initiator modules;
    a target module having data registers accessible by said initiator modules and including a plurality of indexed registers, and an index register linked to the indexed registers and accessible in write mode via a corresponding write request, to store an index value for said indexed registers; and,
    an arbitration unit for arbitrating between conflicting requests to access the data registers, initiated by the initiator modules;
    first and second additional index registers, respectively linked to the first and second initiator modules;
    an address decoding unit constructed to set an indexed register select signal, in response to any request to access one of the indexed registers; and
    a control unit structured to:
    in response to a request from a requesting one of the initiator modules to write an index value in the index register linked to said indexed registers, order the storage of the index value in the additional index register linked to the requesting initiator module; and
    in response to any request to access one of the indexed registers initiated by the requesting initiator module, which results in the indexed register select signal being set, copy the index value from the additional index register linked to said requesting initiator module to the index register linked to said indexed registers, prior to execution of said access request.

6. A storage key according to claim 5, further comprising a control module incorporating the arbitration unit, the address decoding unit and/or the control unit.

7. A storage key according to claim 6, wherein the first additional index register and/or the second additional index register are included in the control module.

8. A storage key according to claim 5, wherein the first additional index register linked is included in said first initiator module, and/or the second additional index register is included in said second initiator module.

9. An access controller that interfaces first and second initiator modules with a target module having data registers accessible by said initiator modules and including a plurality of indexed registers, and an index register linked to the indexed registers, the access controller comprising:
    first and second additional index registers, respectively linked to the first and second initiator modules;
    a control unit structured to, in response to a request from a requesting one of the initiator modules to write an index value in the index register linked to said indexed registers, order the storage of the index value in the additional index register linked to the requesting initiator module; and structured to, in response to an access request to access one of the indexed registers initiated by the requesting initiator module, copy the index value from the additional index register linked to said requesting initiator module to the index register linked to said indexed registers, prior to execution of said access request; and
    an arbitration unit for arbitrating between conflicting requests to access the data registers, initiated by the initiator modules.

10. The access controller of claim 9, further comprising:
    an address decoding unit constructed to set an indexed register select signal in response to a request to access one of the indexed registers, wherein the control unit copies the index value from the additional index register linked to said requesting initiator module to the index register linked to said indexed registers in response to receiving the indexed register select signal from the address decoding unit.

11. The access controller of claim 10 wherein the address decoding unit and the control unit are integrated in a control module.

12. The access controller of claim 11, wherein at least one of the first and second additional index registers is included in the control module.

13. The access controller of claim 9, wherein said first and second initiator modules are integrated on a chip with the access controller.

14. An access controller for interfacing first and second initiator modules with a target module having data registers accessible by said initiator modules and including a plurality of indexed registers, and an index register linked to the indexed registers, the access controller comprising:
 first means for, in response to a request from a requesting one of the initiator modules to write an index value in the index register linked to said indexed registers, ordering the storage of the index value in an additional index register linked to the requesting initiator module;
 second means for, in response to an access request to access one of the indexed registers initiated by the requesting initiator module, copying the index value from the additional index register linked to said requesting initiator module to the index register linked to said indexed registers, prior to execution of said access request; and
 means for arbitrating between conflicting requests to access the data registers, initiated by the initiator modules.

15. The access controller of claim 14, further comprising:
 setting means for setting an indexed register select signal in response to a request to access one of the indexed registers, wherein the first means copies the index value from the additional index register linked to said requesting initiator module to the index register linked to said indexed registers in response to receiving the indexed register select signal from the setting means.

16. The access controller of claim 15 wherein the setting means and the first means are integrated in a control module.

17. The access controller of claim 16 wherein the additional index register is included in the control module.

18. A method of interfacing first and second initiator modules with a target module having data registers accessible by said initiator modules and including a plurality of indexed registers, and an index register linked to the indexed registers, the method comprising:
 in response to a request from a requesting one of the initiator modules to write an index value in the index register linked to said indexed registers, ordering the storage of the index value in an additional index register linked to the requesting initiator module;
 in response to an access request to access one of the indexed registers initiated by the requesting initiator module, copying the index value from the additional index register linked to said requesting initiator module to the index register linked to said indexed registers, prior to execution of said access request; and
 arbitrating between conflicting requests to access the data registers, initiated by the initiator modules.

19. The method of claim 18, further comprising:
 setting an indexed register select signal in response to a request to access one of the indexed registers, wherein copying the index value from the additional index register linked to said requesting initiator module to the index register linked to said indexed registers is done in response to the indexed register select signal.

20. An access controller that interfaces first and second initiator modules with a target module having data registers accessible by said initiator modules and including a plurality of indexed registers, and an index register linked to the indexed registers, the access controller comprising:
 first and second additional index registers, respectively linked to the first and second initiator modules;
 a control unit structured to, in response to a request from a requesting one of the initiator modules to write an index value in the index register linked to said indexed registers, order the storage of the index value in the additional index register linked to the requesting initiator module; and structured to, in response to an access request to access one of the indexed registers initiated by the requesting initiator module, copy the index value from the additional index register linked to said requesting initiator module to the index register linked to said indexed registers, prior to execution of said access request; and
 an address decoding unit constructed to set an indexed register select signal in response to a request to access one of the indexed registers, wherein the control unit copies the index value from the additional index register linked to said requesting initiator module to the index register linked to said indexed registers in response to receiving the indexed register select signal from the address decoding unit.

21. The access controller of claim 20 wherein the address decoding unit and the control unit are integrated in a control module.

22. The access controller of claim 21, wherein at least one of the first and second additional index registers is included in the control module.

23. The access controller of claim 20, wherein said first and second initiator modules are integrated on a chip with the access controller.

24. An access controller for interfacing first and second initiator modules with a target module having data registers accessible by said initiator modules and including a plurality of indexed registers, and an index register linked to the indexed registers, the access controller comprising:
 first means for, in response to a request from a requesting one of the initiator modules to write an index value in the index register linked to said indexed registers, ordering the storage of the index value in an additional index register linked to the requesting initiator module;
 second means for, in response to an access request to access one of the indexed registers initiated by the requesting initiator module, copying the index value from the additional index register linked to said requesting initiator module to the index register linked to said indexed registers, prior to execution of said access request; and
 setting means for setting an indexed register select signal in response to a request to access one of the indexed registers, wherein the first means copies the index value from the additional index register linked to said requesting initiator module to the index register linked to said indexed registers in response to receiving the indexed register select signal from the setting means.

25. The access controller of claim 24 wherein the setting means and the first means are integrated in a control module.

26. The access controller of claim 25 wherein the additional index register is included in the control module.

27. A method of interfacing first and second initiator modules with a target module having data registers accessible by said initiator modules and including a plurality of indexed registers, and an index register linked to the indexed registers, the method comprising:

in response to a request from a requesting one of the initiator modules to write an index value in the index register linked to said indexed registers, ordering the storage of the index value in an additional index register linked to the requesting initiator module;

in response to an access request to access one of the indexed registers initiated by the requesting initiator module, copying the index value from the additional index register linked to said requesting initiator module to the index register linked to said indexed registers, prior to execution of said access request; and setting an indexed register select signal in response to a request to access one of the indexed registers, wherein copying the index value from the additional index register linked to said requesting initiator module to the index register linked to said indexed registers is done in response to the indexed register select signal.

28. The method of claim 27, further comprising setting a storage control signal in response to the request from the requesting one of the initiator modules to write the index value in the index register linked to said indexed registers, wherein ordering the storage of the index value is performed in response to the storage control signal.

* * * * *